E. A. HUFF.
PORTABLE BENCH TOOL.
APPLICATION FILED OCT. 27, 1914.
1,201,050.
Patented Oct. 10, 1916.
3 SHEETS—SHEET 3.
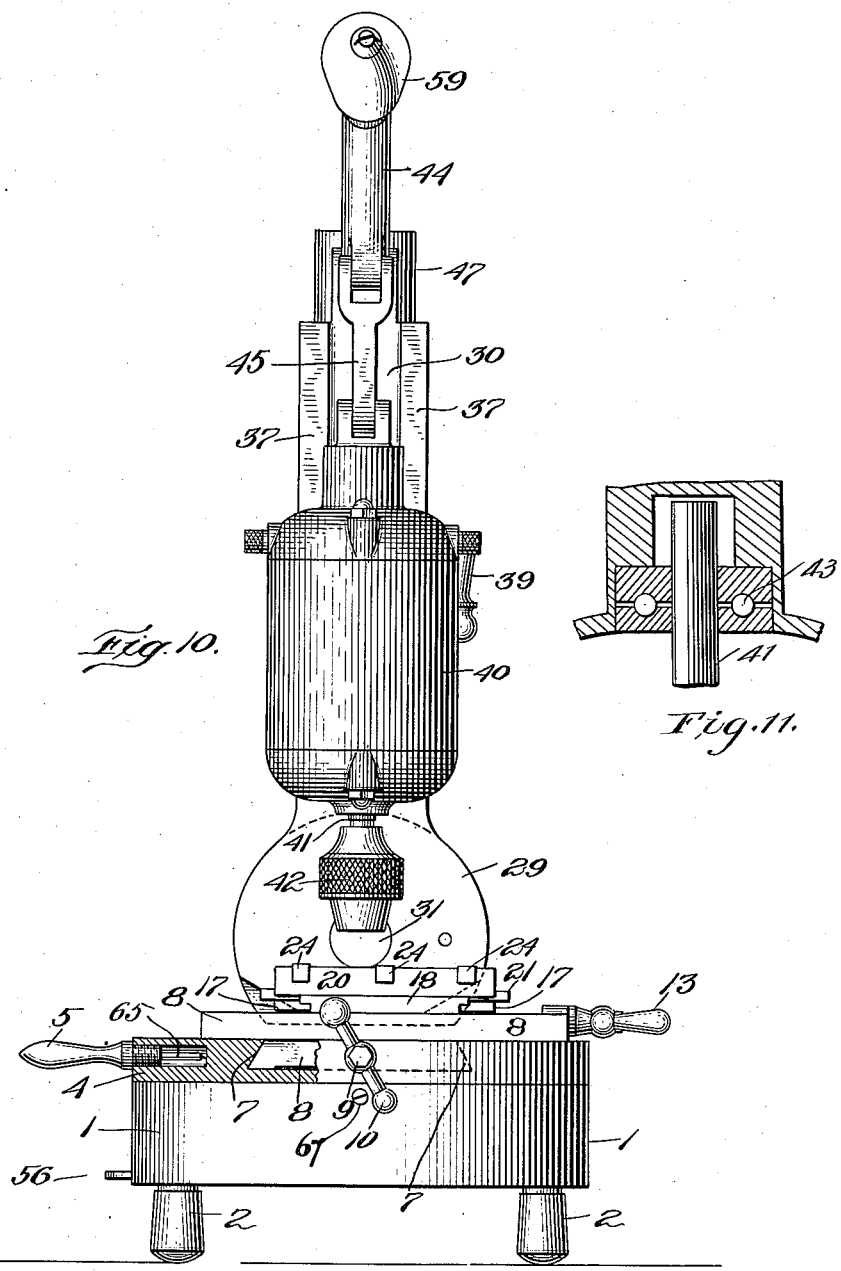

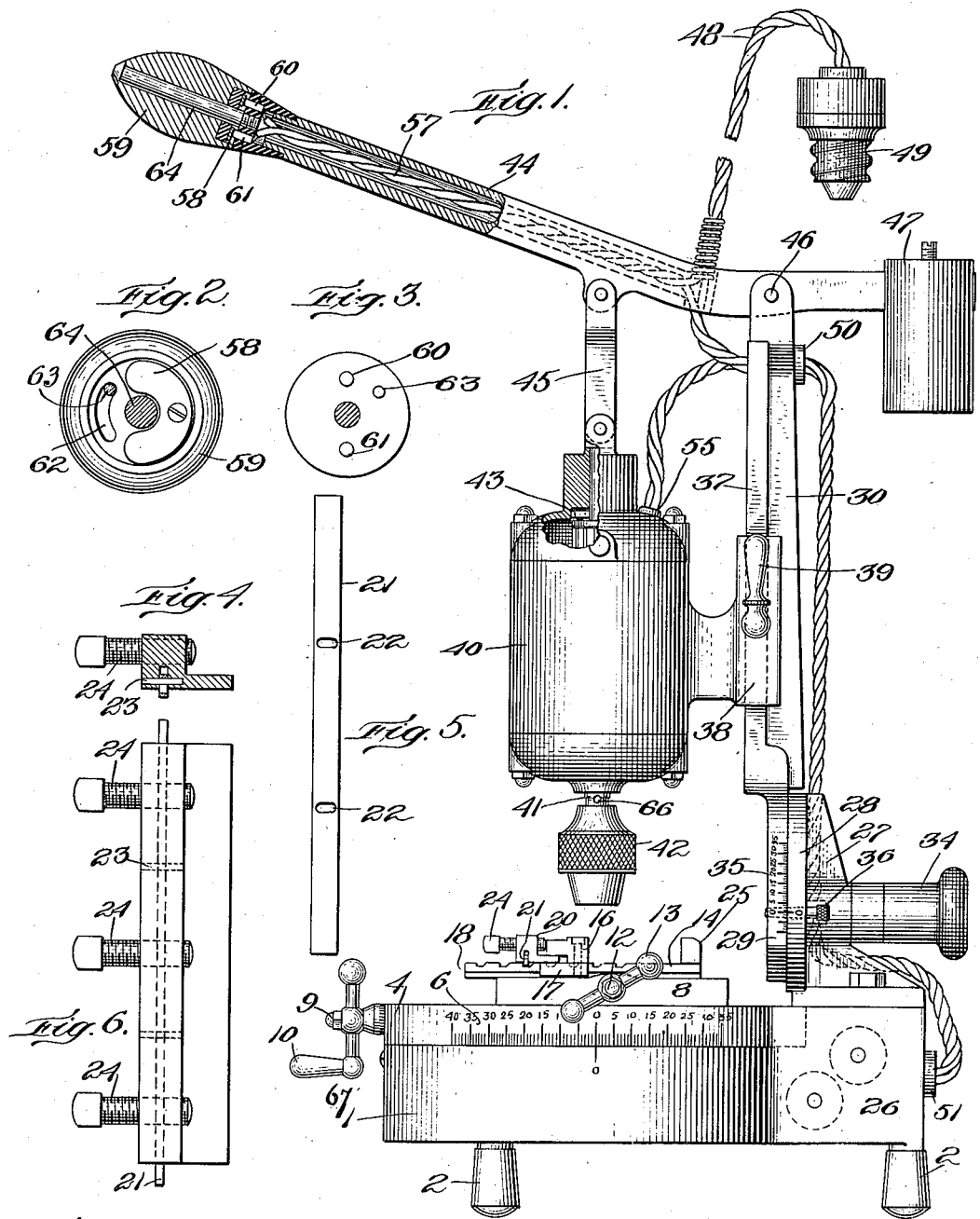

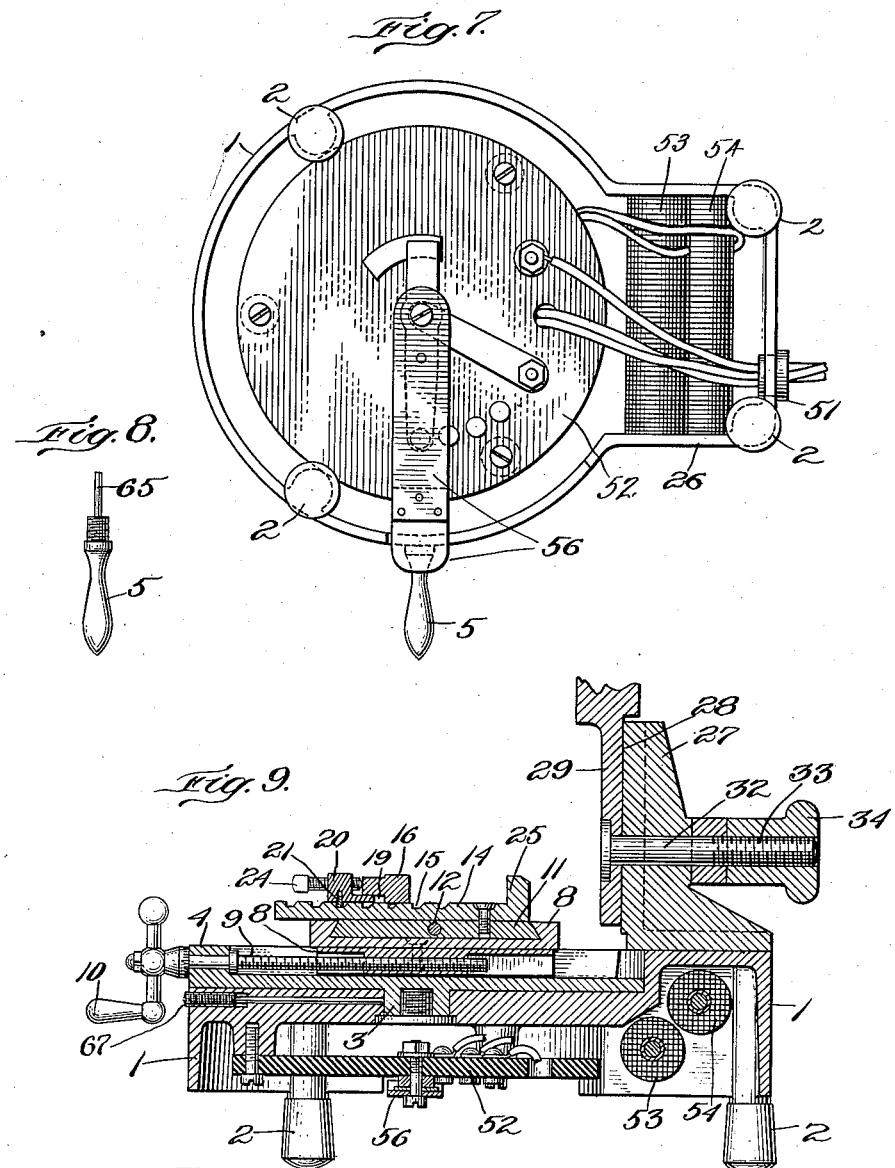

UNITED STATES PATENT OFFICE.

EDWIN A. HUFF, OF BOSTON, MASSACHUSETTS.

PORTABLE BENCH-TOOL.

1,201,050.	Specification of Letters Patent.	Patented Oct. 10, 1916.

Application filed October 27, 1914. Serial No. 868,905.

*To all whom it may concern:*

Be it known that I, EDWIN A. HUFF, a citizen of the United States, and resident of Boston, county of Suffolk, State of Massachusetts, have invented an Improvement in Portable Bench-Tools, of which the following description, in connection with the accompanying drawings, is a specification, like letters on the drawings representing like parts.

My invention is a self-contained power-actuated bench tool for small, fine work, especially adapted to the use of dentists, jewelers, college and other laboratories, etc. My object is to provide an exceedingly light, compact, and universally adjustable machine which can be moved around on the professor's table, the doctor's shelf, the jeweler's bench or show case, without injury or strain to the machine, its place of rest, the user, or the work. In other words, I have sought to afford the humble artisan, scientist or mechanician, a single tool at small expense, capable of taking the place of a usually large, expensive and complicated series of machines.

Besides the portable character of my machine, I mention among its important features, considered both singly and collectively, a chuck having direct connection with, or mounting on, the motor, and the latter having a hand controlled movement toward and from the work support, and preferably also means for starting and stopping the motor capable of being simultaneously actuated by the same hand which controls said movement and as it is so controlling said movement, a supporting guide for said motor having accurate hand adjustment at any desired angle to the work support, a rotatable table or bed, and a work support and slide rest mounted on said table, having adjustment in two directions and carrying a small work clamp.

The power used is preferably electrical, and in the base of the machine I mount a small rheostat control giving two or more speeds. Thrust bearings are provided for the tool chuck (a drill chuck for instance) so as not to bring a retarding friction or pressure upon the armature, but leave the latter free to drive the work. The bed turns with reference to a scale and is provided with a locking stud, and handle for turning it,—said handle is specially made for removal so as to be used to hold the armature while adjusting the chuck. Provision is made for locking the vertical or motor slide (which carries the chuck) for use as a profiling machine, and the swinging movement of the support for said slide renders the machine capable of many uses as a milling machine.

Various further features of construction, and resulting advantages, will be made apparent in the course of the following description, taken in connection with the accompanying drawings in which I have shown a complete embodiment of the invention.

In the drawings, Figure 1 shows the machine in side elevation, partly broken away for clearness of illustration; Figs. 2 and 3 are cross sectional views of portions of the handle switch; Figs. 4 and 5 and 6 are views of the work clamp showing the same respectively in cross section, side elevation and top plan; Fig. 7 is an underside view of the machine showing the rheostat and base; Fig. 8 is a detail of the handle above mentioned; Fig. 9 is a fragmentary central vertical section; and Fig. 10 is a view of the machine in front elevation, broken away for clearness of illustration.

The base 1 may be of any suitable shape, being herein shown as mainly circular, and supported for convenience on four rubber tipped legs or pedestals 2. Pivotally mounted by means of a boss 6 on this base 1, is a table 4 adapted to be turned by a handle 5 and provided at one side with a scale 6, see Fig. 1. This table is cut out with usual shaped under-cut ways 7, see Fig. 10, in which is mounted an under-slide rest 8 engaged by a graduated screw 9, operated by a handle 10 for accurate movement across said table in one direction. This bottom slide rest carries a similarly mounted top slide rest 11 actuated by a graduated screw 12 and handle 13. On said top rest, or forming a part thereof, is a plate 14 provided with a series of transverse grooves 15 for holding the work clamp. The latter comprises a block 16 carrying ears 17 at its opposite ends to travel in under-cut ways 18, transversely of the plate 14. The block 16 is under-cut at 19 to receive the thin front edge of a locking block 20 in which a thin bar 21 is loosely mounted for up and down movement so as to be engaged with the left hand wall, Fig. 9, of any of the notches 15 by being depressed thereinto, or disengaged therefrom by being raised. For this purpose this bar has vertically elongated slots 22, see Fig. 5, for receiving the pins 23 of the block 20. The block 20 carries a series of adjusting bolts, or positioning bolts 24, whereby the block 16 may be tightly clamped against one side of the work whose opposite side rests against a block or strong ledge 25 at the farther edge of the plate 14.

Behind the table 4 the base 1 has a rectangular portion 26 on which is rigidly mounted a relatively strong and heavy bracket 27 having a smooth, broad, front face 28 for receiving the similarly shaped rear face of the lower end 29 of the upright or support 30 for the motor and work tool. This support is centrally pivoted at 31 to the bracket 27 by means of a stud 32, whose threaded end 33 is engaged by a hand nut 34. A scale 35 is provided on one edge of the part 29, Fig. 1, and the two members 28 and 29 are removably locked together by a removable pin 36, when the scale indications show that the support is in truly vertical position. The front face of the support is shaped to constitute guides 37, on which moves a vertical slide 38 held in any desired adjustment by properly operating a clamp handle 39. This slide carries an electric motor 40, on the lower end of whose armature 41 is removably mounted a chuck or tool carrier 42. Thrust bearings 43 are provided so that the end pressure of the work or tool in running will not retard the armature. The motor and tool are moved freely up and down on the guides 37 by a hand lever 44 which is pivotally connected to said motor by a link 45 and is fulcrumed at 46 to the upper end of the support 30. Said lever preferably extends rearwardly a short distance, and is provided with a counterbalance 47 so as to facilitate the accuracy and delicacy of the adjustment of the motor and tool up and down with reference to the work.

The motor is herein shown as an electric motor, whose feed wires 48 may derive current through any convenient connection, being herein shown as provided with a usual plug 49, said wires leading through a bushing 50 in the support 30, and thence through a bushing 51 in the base to the rheostat 52 and its resistance coils 53 and 54, and thence back through the bushings 51 and 50 to the motor at 55. The rheostat lever or switch is indicated at 56, but as any form of rheostat may be used, I will not go into the details of construction thereof. The hand lever 44 is hollow and one of the circuit wires is carried in said hollow handle, as clearly shown at 57, Fig. 1, and connected to a handle switch, herein shown as a contact plate 58, secured to the inner end of a rotatable handle-end 59 to engage and disengage with the terminals 60, 61 of the two branches of the circuit wire which is contained in the hollow hand lever. The end, or hand switch 59, has a curved slot 62 for receiving the projecting end of a fixed pin 63 which limits the rotary motion of said switch, and the latter is secured to the lever by means of a long screw or stud 64 on which the hand switch or end 59 has its limited rotary movement.

From the above description, it will be evident that my machine may be conveniently carried in one hand to any position, e. g., on a show case, or bench, or chair, or wherever the user wishes to put it, and when the plug 49 has been screwed into a lamp socket so as to derive the required current, the operator swings the rheostat lever 56 to the right position for the desired speed, and then clamps his work in accurate position by means of the work clamp and shifting the two compound slides one way or the other so as to bring the work into accurate position beneath the drill, for instance. Then the clamp 39 is turned so as to release the motor slide, and the operator, by means of the hand lever 44, moves the motor and drill down with the utmost accuracy to the point which is to be drilled. If the work is exceedingly fine, so that the slight vibration of the motor makes it difficult for the point of the drill to find the prick point of the work, the operator simply turns the handle end 59 so as to stop the motor, but without necessitating turning off the current at the rheostat, or main switch, and as the drill point is brought into nice position, exactly as required, he does not have to take his eye from the work or relieve his hold on the tool, motor or lever, but simply turns the handle end 59 back to operating position, and thereupon the drill starts. This enables the workman to maintain absolute control of the drill, as well as the utmost precision of movement. He moves the tool up and down by hand by means of the lever 44 and clamps the tool wherever required by means of the handle 39. The tool may be held at any angle by means of the adjustments provided by the parts 27, 29, 32 and 34, and the work may be turned at any angle by the rotation of the table 4. When it is desired to remove the chuck 42, the handle 5 is screwed out from the table 4 and its pin extension 65 is inserted in the hole 66 of the armature-end 41 so as to hold the latter stationary while the chuck is being removed. The table is locked in desired adjustment by suitable means, as by a screw 67.

Nearly all of the large parts of the machine, excepting the base, are made of aluminum and of light construction, and this, coupled with the skeleton-like design and the exceedingly simple mountings, movements, and arrangements of parts, make the machine very readily portable, and yet sufficiently stable and durable for the purpose intended. Any rotary tool may be placed on the armature shaft or arbor 41, and as the latter may be swung to any angle, it will be understood that the machine is capable of a wide range of usefulness, which renders it especially serviceable to the small artificer who lacks usual machine shop facilities.

I wish it understood that, excepting as set forth in the more specific claims, I am not limited to the precise construction and arrangement of parts herein shown and herein described as constituting the preferred embodiment of my invention.

Having described my invention, what I claim to be new and desire to secure by Letters Patent is:

1. A machine of the kind described, comprising a work support, an upright tool-support, a combined motor and tool carrier movable up and down on said tool-support, and a hand lever pivoted to said support and to said combined motor and tool carrier for moving the latter by hand toward and from the work on said work support, and means on said hand lever to control the rotation of said motor.

2. A machine of the kind described, comprising a work support, an upright tool-support, a combined electric motor and tool carrier movable up and down on said tool-support, and a hand lever pivoted to said support and to said combined motor and tool carrier for moving the latter by hand toward and from the work on said work support, said hand-lever containing a starting and stopping switch adapted to be operated by the hand which is operating the lever whereby the operator may simultaneously and delicately control the motor and the position of the tool.

3. A machine of the kind described, having a motor and tool carrier mounted for movement toward and from the work, and a counterbalanced hand lever attached to the motor for simultaneously moving the motor and tool carrier and controlling both the movement of said motor toward and from the work and the rotation of said motor.

4. A machine of the kind described, comprising a work support, an upright extending therefrom, an electric motor mounted to move up and down on said upright, a tool carrier mounted on the armature of said motor, thrust bearings for receiving the end thrust of said tool carrier, and means comprising a handle for simultaneously moving said motor and tool carrier toward and from the work, and starting and stopping said motor.

5. A machine of the kind described, comprising a work support, an upright mounted thereon to swing at an angle to the work support, a combined motor and tool carrier mounted to slide on said upright, and a hand-lever directly connected to said motor and pivoted on said upright for sliding the motor and carrier toward and from the work.

6. A machine of the kind described, comprising a work support, an upright mounted thereon to swing at an angle to the work support, a combined motor and tool carrier mounted to slide on said upright, and a hand-lever directly connected to said motor and pivoted on said upright for sliding the motor and carrier toward and from the work, said upright being provided with a hand operated clamp for clamping it at any desired angular adjustment.

7. A machine of the kind described, comprising a work support, an upright mounted thereon to swing at an angle to the work support, a combined motor and tool carrier mounted to slide on said upright, a hand-lever directly connected to said motor and pivoted on said upright for sliding the motor and carrier toward and from the work, said upright being provided with a hand operated clamp for clamping it at any desired angular adjustment, and means for positively locking the upright in vertical position.

8. A machine of the kind described, comprising a work support, an upright mounted on said work support, a combined motor and tool carrier arranged to slide on said upright, a hand-lever pivoted to said upright and to said carrier to move the carrier toward and from the work, and means for cutting off driving power from the motor by a slight rotary movement of said hand-lever while moving said motor and carrier in its slide.

9. A machine of the kind described, comprising a portable base, a rotary table thereon, compound slide rests carried by said table and having lineal adjustment in two directions, a work clamp mounted thereon in position to hold the work beneath the tool, an upright mounted on said base, a combined electric motor and tool carrier mounted to slide on said upright toward and from the work, a hand lever directly connected to said upright and to said motor for enabling the operator to move the motor and tool carrier at will by hand, said base being hollow and containing a rheostat and its switch lever, connections from said rheostat to said motor and to a switch plug, and said hand-lever containing a hand operated switch in the circuit of said motor for starting and stopping the motor independently of the rheostat.

10. A machine of the kind described, comprising a portable base, a rotary table thereon, compound slide rests carried by said table and having lineal adjustment in two directions, a work clamp mounted thereon in position to hold the work beneath the tool, an upright mounted on said base, a combined electric motor and tool carrier mounted to slide on said upright toward and from the work, a counter-balanced hand lever pivoted to said upright and to said motor for enabling the operator to move the motor and tool carrier at will with slight effort by hand, said base being hollow and containing a rheostat and its switch lever, connections from said rheostat to said motor and to a switch plug, said hand-lever being hollow and containing therein a portion of the circuit wires of said motor, and a hand operated switch for controlling the motor independently of the rheostat lever.

In testimony whereof, I have signed my name to this specification, in the presence of two subscribing witnesses.

EDWIN A. HUFF.

Witnesses:
GEO. H. MAXWELL,
JAMES R. HODDER.